M. J. WEBER.
WEIGHING SCALE.
APPLICATION FILED MAY 13, 1920.
1,383,504.
Patented July 5, 1921.
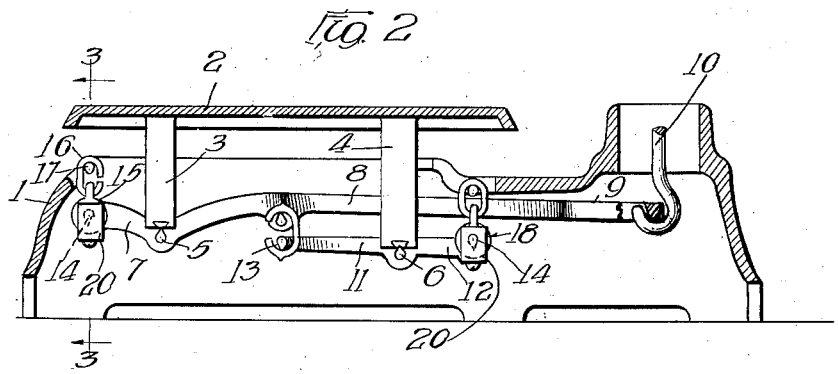
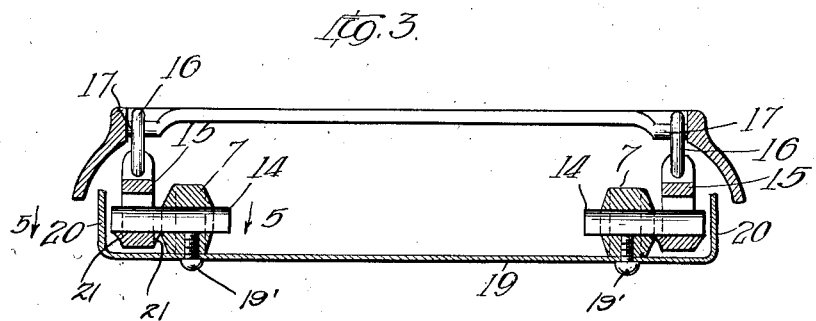
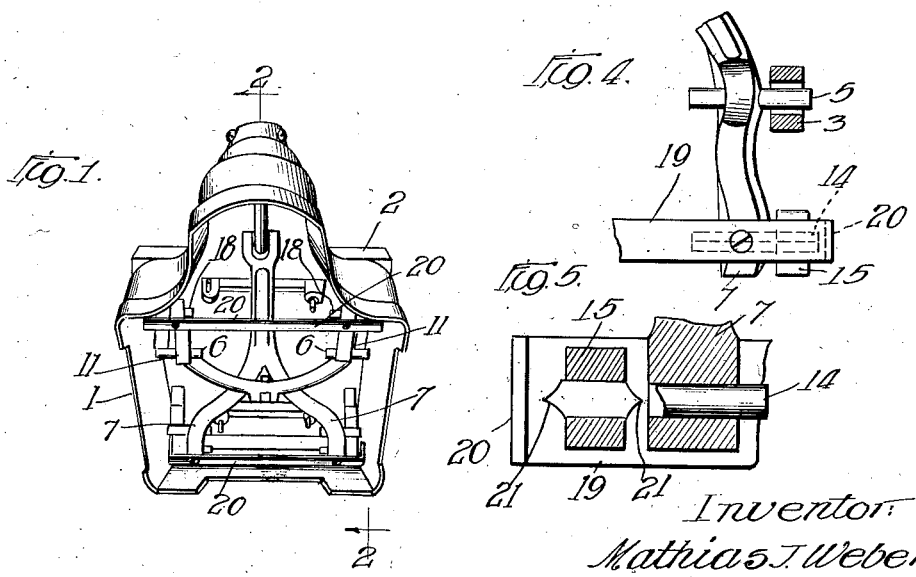
Inventor
Mathias J. Weber.
By Murray Lotz & Wilson
Attys

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

WEIGHING-SCALE.

1,383,504.　　　　　Specification of Letters Patent.　　Patented July 5, 1921.

Application filed May 13, 1920. Serial No. 381,014.

*To all whom it may concern:*

Be it known that I, MATHIAS J. WEBER, a citizen of the United States, and resident of Chicago, in the county of Cook and State of Illinois, have invented certain new and useful Improvements in Weighing-Scales, of which the following is a specification.

My invention relates to improvements in weighing scales and has special reference to scales in which levers or beams are hung upon knife edge supports which are transversely separated.

The object of my invention is to provide a scale having a beam which is supported on knife edge bearings spaced transversely of the beam, with means which will limit the transverse movement of the beam relatively to the members upon which the knife edge bearings are supported to prevent the accidental displacement of the beam or the support and without adding any friction to the movement of the beam.

My invention has to do principally with a form of weighing scales which is movable from place to place and I have found that the beams in such scales are frequently displaced as the scales are transported and it is an especial object of my present invention to provide a simple and effective guard to prevent such displacement.

For a clear understanding of my invention, attention is directed to the accompanying drawings forming part of this specification and in which I have illustrated a semi-portable scale provided with beam guards made in accordance with my invention and in which drawings:—

Figure 1 is a perspective view of a scale as seen from the under side;

Fig. 2 is a fragmentary longitudinal vertical section on the line 2—2 of Fig. 1;

Fig. 3 is a longitudinal transverse vertical section on the line 3—3 of Fig. 2;

Fig. 4 is a fragmentary detail bottom plan view of one side of one of the beams; and Fig. 5 is a fragmentary horizontal section on the line 5—5 of Fig. 3.

In said drawings, 1 is a scale frame or casing within which the scale mechanism is housed, and 2 is the platform upon which the articles to be weighed are placed.

The platform 2 is secured to and supported upon vertical members or posts 3, 4, which rest at their lower ends upon knife-edge bearings 5 and 6 respectively.

The bearings 5 are secured in the side bars 7 of a beam or lever 8, the forward end 9 of which is hooked to a vertically extending pulling member or rod 10 which transmits the pull to a suitable weight indicating device not shown. The hook on the rod 10 engages a cross bar 9' rigid with forward end 9 of the lever 8.

The bearings 6 are fixed in the side bars 11 of a U-shaped lever or beam 12 arranged beneath the lever 8. The middle of the beam 12 is linked to the middle portion of the lever 8 by a C-shaped link 13.

The lever 8 is supported at its rear end on knife-edge bearings 14 which are secured rigidly in the side bars 7. The two bearings 14 are in transverse alinement with each other and they project out from the sides of the arms 7. The projecting ends of the bearings 14 are received in supporting members 15 which are in the form of loops or rings which are in turn hung upon links 16 which are carried on supporting projections 17 formed in the top plate of the housing or frame 1. By this means of supporting the levers they are free of all friction as the several links hang freely. The forward ends of the lever 11 hang from the top of the housing in a similar manner upon knife-edge bearings 18.

These levers 7 and 11 being thus in a sense loosely hung may be displaced transversely sufficiently to cause the knife-edge bearings at one side to drop out of their supporting loops or to cause the loops to slide off of the knife-edge bearings and thus put the scale out of commission.

To prevent such sidewise relative displacement of the lever 8 and the links upon which the knife-edge bearings 14 are hung, I provide a flat sheet-metal guard bar 19 extending transversely from one side member 7 to the other and beneath the knife-edge bearing members 14. The ends 20 of this guard bar are bent upwardly at right angles to its length and these ends are arranged in alinement with and spaced slightly from the outer free ends of the bearing members 14. These free spaces at the ends of the bearing member 14 are too small to permit the escape of the projecting bearing and of the supporting ring 15 and consequently the lever 8 and the supporting rings cannot be relatively displaced or separated.

The member 19 is rigidly secured to the lever 8 by screws 19' which bolt the bar to the under side of the two sides 7 of the lever 8 adjacent to the end of the bar and consequently the bar is held against any movement relatively to the lever.

The lever 12 is also provided with one of the guard bars 19 which is arranged on its forward end and has its ends bent upwardly opposite to the outer ends of the knife-edge bearings 18, whereby the lever 12 is also prevented from being displaced relatively to the supporting links into which the knife-edge bearings 18 project and by which the lever 8 is supported.

For the purpose of retaining the support rings or links 15 spaced transversely on the knife-edge supports 14 between the adjacent faces of the sides of the levers and the up-turned ends 20 of the retainers or guards 19, I provide the links with anti-friction V-shaped points 21, which project longitudinally of the knife-edge supports 14. The over-all dimensions of the several links 15 longitudinally of the knife-edge supports 14 is less than the normal distance between the up-turned end 20 of the bar 19 and the opposing side of the lever, so that the link 15 is free at all times between these two surfaces. If it should occur that the link 15 should be forced longitudinally of the knife-edge support 14 into contact with either the guard end 20 or the lever, the anti-friction point 21 will prevent the development of an appreciable amount of friction.

As many modifications of my invention will readily suggest themselves to one skilled in the art, I do not limit or confine my invention to the specific structures herein shown and described.

I claim:

1. In a weighing scale having a beam or lever provided with transversely separated bearing projections, supporting rings surrounding said projections and a guard bar secured to and extending across said beam from side to side in substantial alinement with said projections, the ends of said guard bar bent to extend close to the outer free ends of said projections.

2. In a weighing scale having a beam or lever which has transversely separated side bars, supporting projections carried by said side bars, said projections being in substantial alinement with each other and their free ends extending out from the side bars to receive supporting rings, a guard bar extending across said lever and secured to the side bars, the ends of the guard bar bent at substantially right angles to the bar to extend in proximity to the free ends of said projections and preventing the relative displacement of the lever and the supporting rings.

3. In a weighing scale having a beam or lever which has transversely separated side bars, supporting projections carried by said side bars, said projections being in substantial alinement with each other and their free ends extending out from the side bars to receive supporting rings, a removable guard bar extending across the lower side of said lever and secured to the side bars, the ends of the guard bar bent up at substantially right angles to the bar to extend in proximity to the free ends of said projections and preventing the relative displacement of the lever and the supporting rings.

4. In a weighing machine, a lever which has transversely separated, alined knife-edge supports projecting from the outer sides of said lever, a guard carried by said lever having its ends spaced from the outer ends of said supports, links on said supports, and said links provided with anti-friction points for contact with the sides of the lever and the ends of the guard.

5. In a weighing scale, a lever provided with alined knife-edge supports projecting laterally therefrom, a guard carried by the lever and having its ends disposed adjacent to the ends of said supports, supporting links on said supports, and the links provided with anti-friction points for contact with the sides of the lever and said ends of the guard, the overall dimensions of each link longitudinally of the support on which it is mounted being less than the distance between the side of the lever and the end of the guard between which it is arranged.

Signed at Chicago, Illinois, this 1st day of May, 1920.

MATHIAS J. WEBER.